United States Patent Office

3,553,269
Patented Jan. 5, 1971

3,553,269
METHOD FOR THE PREPARATION OF PHENOLSULFIDE STABILIZERS
Henry Hugh Richmond, Leninsky prospekt 86, kv. 319, and Elena Vasilievna Pronina, Ul. Gorkogo 8, korp. 2, kv. 38, both of Moscow, U.S.S.R.
No Drawing. Filed Feb. 28, 1967, Ser. No. 619,201
Int. Cl. C07c *149/38;* C08f *45/58*
U.S. Cl. 260—609       6 Claims

ABSTRACT OF THE DISCLOSURE

A method of preparing substituted phenolsulfides by reacting a mixture of tert-butyl cresols with sulfur dichloride in an organic solvent such as benzine, white spirit and petroleum ether.

BACKGROUND OF INVENTION

The present invention relates to a method of preparing substituted phenolsulfide stabilizers for polymeric materials such as raw rubber, vulcanized rubber, polyethylene and other oxidizable products.

The known method of preparing the stabilizer 1,1-bis (4-hydroxy - 2 - methyl-5-tert-butylphenyl) sulfide comprises the reaction of 6-tert-butyl-m-cresol with sulfur dichloride in a carbon tetrachloride medium.

However, 6-tert-butyl-m-cresol in an expensive product since it is prepared from pure m-cresol. m-Cresol, in its own right, is also an expensive product since it is difficult to separate it from its mixtures with m- and p-cresol, with which it is produced since their boiling points are very close.

The main object of the preset invention is the preparation of crystalline 1,1-bis (4-hydroxy-2-methyl-5-tert-butylphenyl) sulfide from a cheaper starting material than 6-tert-butyl-m-cresol.

Another object of the invention is the development of a simple and effective method for the preparation of stabilizers for polymeric materials.

Still another object of the invention is the utilization of by-products obtained in the manufacture of 2,6-di-tert-butyl phenol, known also as Ionol.

SUMMARY OF THE INVENTION

The above mentioned and other objects are achieved by a new method for the preparation of substituted phenolsulfide stabilizers for polymeric and other oxidizable products. This method comprises the reaction of a mixture of tert-butyl cresols with sulfur dichloride in an organic solvent. In accordance with the method of invention, as a source of tert-butyl cresols there is utilized a mixture of alkylated cresols and alkylated substituted phenols containing 6-tert-butyl-m-cresol and 2-tert-butyl-p-cresol. The process is carried out in a medium comprising a hydrocarbon solvent of the paraffin or cycloaliphatic series or their mixtures. After the reaction, the desired product is separated from the reaction mixture by filtration or by distilling off the solvent.

In the above mentioned solvents crystalline 1,1-bis (4-hydroxy - 2-methyl-5-tert-butylphenyl) sulfide precipitates out as it is formed. Using carbon tetrachloride as a solvent does not permit of such a separation step.

Depending on the method of separating the final product, the latter may be obtained as relatively pure crystalline 1,1-bis (4-hydroxy-2-methyl - 5-tert-butylphenyl) sulfide or in the form of a viscous, non-crystalline mass, i.e. a mixture of 1,1-bis (4-hydroxy-2-methyl-5-tert-butylphenyl) sulfide with other substituted phenolsulfides.

The crystalline product is obtained by filtering off the precipitate that appears in the reaction mixture. By distilling off the solvent from the mother liquor, there is obtained a non-crystalline mass which also is an effective stabilizer.

As a hydrocarbon solvent there may be used various fractions of benzine, white spirit or petroleum ether.

DETAILED DESCRIPTION OF INVENTION

For the preparation of the stabilizer, there may be used a mixture of 6-tert butyl-m-cresol and 2-tert-butyl-p-cresol and other alkylated phenols. The above mentioned mixture of 6-tert-butyl-m-cresol and 2-tert-butyl-p-cresol may be obtained by the alkylation of commercial m- and p-cresol, which contains such impurities as ethyl phenol and xylenols, with isobutylene, to the point where the product contains predominantly mono-tert-butyl cresols.

This mixture may also be obtained by the extraction of by-products formed in the manufacture of 2,6-di-tert-butyl phenol (Ionol).

The proposed invention enables the simplification at a decreased cost of the method of preparing 1,1-bis (4-hydroxy - 2-methyl - 5-tert-butylphenyl) sulfide because the starting material is not relatively pure 6-tert-butyl-m-cresol but its mixture with other alkylated cresols. In this way, the complex process of separating meta and para cresol is unnecessary in order to obtain pure m-cresol and from the latter, 6-tert-butyl-m-cresol.

The invention enables one to obtain in addition to a crystalline product, a mixture of products consisting of 1,1-bis (2-hydroxy-3-tert-butyl - 5-methylphenyl) sulfide, 1,1-bis (4-hydroxy-2-methyl - 5-tert-butylphenyl) sulfide and 1-(2-hydroxy - 3 - tert-butyl-6-methylphenyl-1-(4-hydroxy - 5-tert-butyl - 2-methylphenyl) sulfide all of which are stabilizers for polymeric materials and other oxidizable materials.

EXAMPLE 1

To a three-necked flask, provided with a stirrer, reflux condenser and a dropping funnel there is added 20 g. (0.122 mole) of a mixture consisting of 6-tert-butyl-m-cresol and 2-tert-butyl-p-cresol dissolved in purified white spirit. To the solution, there is added with stirring and cooling with a water bath over a period of 100 minutes a solution of 6.9 g. (0.067 mole) of sulfur dichloride in 60 ml. white spirit. Then the mixture is mixed for a period of 60–80 minutes until the color of the sulfur dichloride disappears. The mixture is then blown with nitrogen for a period of 1–2 hours to remove the hydrogen chloride formed during the reaction. The white precipitate that forms is filtered off and dried to constant weight. The yield of 1,1-bis (4-hydroxy-2-methyl-5-tert-butylphenyl) sulfide M.P. 150°–152° C. amounts to 11.0–11.9 g. or 50–54% of theory. The mother liquor is evaporated at 10 mm. Hg to yield a viscous mass which is further dried in a vacuum oven to a constant weight of 11.3–12.3 g. which also is an effective stabilizer. The yield of 50–54% is arbitrarily based on all the butyl cresols present; actually the yield is much higher since some of the butyl cresol is 2-tert-butyl-p-cresol.

EXAMPLE 2

To a three-necked flask, equipped with an efficient stirrer, reflux condenser and dropping funnel, there is added 398 g. (2.43 moles) of a mixture consisting of 6-tert-butyl-m-cresol and 2-tert-butyl-p-cresol. This mixture was isolated from a fraction boiling between cresol and Ionol obtained as a by-product in the manufacture of Ionol. There is also added 1500 ml. of petroleum ether. To the resulting solution there is added with constant stirring and cooling with a water bath to 20°–30° C., over a period of 2 hours 125.1 g. (1.22 moles) of sulfur dichloride in 1000 ml. of petroleum ether. Then the mixture is stirred until the color of sulfur dichloride disappears. The solvent is distilled off and the viscous residue which consists of a mixture of substituted phenolsulfide is used as a stabilizer for polymeric materials.

EXAMPLE 3

To a three-necked flask, equipped with an efficient stirrer, reflux condenser and dropping funnel, there is added 400.1 g. (2.469 moles) of a mixture of 6-tert-butyl-m-cresol and 2-tert-butyl-p-cresol and 1500 ml. of petroleum ether. To the solution formed, with stirring and cooling on a water bath to 20–30° C. there is added over three hours a solution of 150.4 g. (1.460 moles) of sulfur dichloride dissolved in 1000 ml. of petroleum ether. The reaction mixture is reacted with stirring another 6–7 hours until the color of the sulfur dichloride disappears, and then the solvent is distilled off with steam. The product after the removal of the solvent is dried to constant weight. The weight of product, which consists of a mixture of substituted phenolsulfides in the form of a yellow non-crystalline mass amounts to 474.8 g.

Although the present invention is described in terms of a preferred way of carrying it out, it will be understood, by those skilled in the art, that changes and modifications can be made without altering the idea and scope of the invention.

These changes and modifications should be considered as falling within the true spirit and scope of the invention as defined by appended claims.

Substiuted phenolsulfides obtained by the proposed method were tested as stabilizers for polyethylene made by the high pressure method and the low pressure method at a temperature of 160° C. for a period of 6 hours using a stabilizer concentration of 0.01 mole per kg. of polyethylene. The results of the tests are given in Table 1. For comparison, the results obtained in testing the above polyethylene types with a commercial sample of 1,1-bis (4-hydroxy-2-methyl-5-tert-butylphenyl) sulfide are also given.

TABLE 1

| Type of polymer | Stabilizer | 1 hour E, percent | 1 hour tan σ | 2 hours E, percent | 2 hours tan σ | 4 hours E, percent | 4 hours tan σ | 6 hours E, percent | 6 hours tan σ |
|---|---|---|---|---|---|---|---|---|---|
| High pressure polyethylene | Crystalline stabilizer obtained according to Example 1. | 438 | 0.0009 | 398 | 0.0007 | 362 | 0.0009 | 392 | 0.0009 |
|  | Without stabilizer | 478 | 0.0009 | 194 | 0.0040 | 98 | 0.0107 | 76 | 0.0167 |
| Low pressure polyethylene | Non-crystalline stabilizer from the mother liquor according to Example 1. | 650 | 0.0005 | 658 | 0.0004 | 632 | 0.0004 | 572 | 0.0003 |
|  | Commercial 1,1-bis (4-hydroxy-2-methyl-5-tert butyl phenyl) sulfide. | 674 | 0.0003 | 610 | 0.0003 | 600 | 0.0003 | | |
|  | Without stabilizer | 807 | 0.00025 | 12 | 0.0026 | 4 | 0.0109 | | |

In Table 1, E, percent designates the relative elongation in percent and tan σ, the dissipation factor at a frequency of 10 c.p.s.

From the table it is clear, that the substituted phenolsulfides obtained by the proposed process are effective stabilizers of high and low pressure polyethylene. Unstabilized polyethylene even after two hours milling shows a greatly decreased relative elongation (E, percent) and an increased dissipation factor.

The stabilizers obtained by the proposed method were tested in the stabilization of polypropylene fiber in air at 150° C. for a period of 16 hours and with radiation with ultraviolet light at a temperature of 90° C. for a period of 20 hours. The physical and mechanical properties of the fiber before and after testing are given in Table 2.

TABLE 2

| Expt. No. | Stabilizer | Amount stabilizer introduced, percent | Initial Tensile strength, km. | Initial Relative elongation, percent | After heating to 150° Tensile strength, km. | After heating to 150° Relative elongation retained, percent | After heating to 150° Residual tensile strength, percent | After irradiation with ultraviolet light Tensile strength, km. | After irradiation with ultraviolet light Relative elongation retained, percent | After irradiation with ultraviolet light Residual tensile strength, percent |
|---|---|---|---|---|---|---|---|---|---|---|
| 1 | Without stabilizer | | 34.2 | 32.3 | (1) | (1) | (1) | (2) | (2) | (2) |
| 2 | Crystalline stabilizer obtained in Example 1. | 0.5 | 43.6 | 26.3 | 26.3 | 61.0 | 60.3 | 33.7 | 38.0 | 77.0 |
| 3 | Commercial bis(4-hydroxy-2-methyl-5-tert-butyl phenyl) sulfide. | 0.5 | 23.0 | 21.5 | (2) | (2) | (2) | | | |
| 4 | Stabilizer obtained in Example 3. | 0.5 | 45.8 | 24.9 | 21.8 | 89.0 | 47.5 | 33.8 | 38.0 | 73.5 |
| 5 | Stabilizer obtained from the mother liquor of Example 1. | 0.5 | 43.8 | 22.8 | 25.9 | 61.9 | 59.0 | 37.9 | 28.0 | 86.0 |

[1] Fiber disintegrates after 3–4 hours.
[2] Fiber disintegrates.

What is claimed is:

1. A method for preparation of substituted phenol-sulfide stabilizers for polymers and other oxidizable materials comprising reacting a mixture of impure 6-tert-butyl-m-cresol and 2-tert-butyl-p-cresol with sulfur dichloride in a hydrocarbon solvent selected from the group consisting of benzine, while spirit and petroleum ether, the ratio of solvent to alkylated phenol starting materials being from about 3:1 to about 6:1 and separating 1,1-bis(4-hydroxy-2-methyl-5-tert-butylphenyl)sulfide as a product from the reaction medium.

2. A method according to claim 1, wherein the product is obtained in crystalline form from the reaction mixture by filtering the precipitate from the mother liquor.

3. A method according to claim 2, wherein the solvent is distilled off from mother liquor.

4. A method according to claim 1, wherein the isolation of the product from the reaction mixture is effected by distilling off the solvent.

5. A method according to claim 1 wherein said hydrocarbon solvent is selected from the group consisting of benzine, white spirit and petroleum ether.

6. A method according to claim 1 wherein said mixture of impure 6-tert-butyl-m-cresol and 2-tert-butyl-p-cresol additionally contains butylated phenols produced by the alkylation of dicresol with isobutylene.

References Cited

UNITED STATES PATENTS

| | | | |
|---|---|---|---|
| 2,346,826 | 4/1944 | Cook et al. | 260—609 |
| 3,069,384 | 12/1962 | Coffield | 260—609X |
| 3,326,800 | 6/1967 | Coffield | 260—609X |

FOREIGN PATENTS

| | | | |
|---|---|---|---|
| 188,965 | 1/1966 | U.S.S.R. | 260—609 |

CHARLES B. PARKER, Primary Examiner

D. R. PHILLIPS, Assistant Examiner

U.S. Cl. X.R.

260—45.95